Patented Dec. 1, 1925.

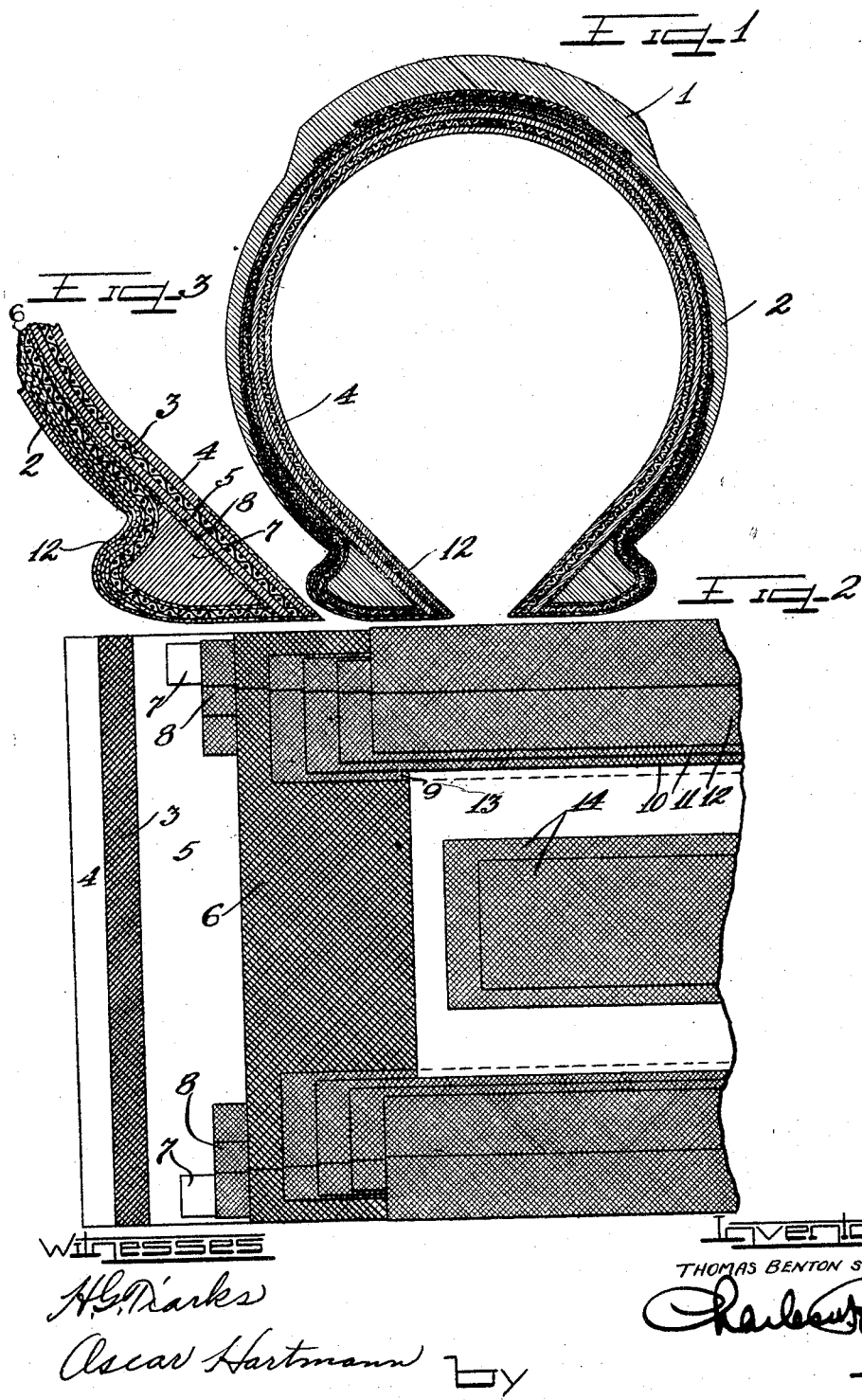

1,563,672

UNITED STATES PATENT OFFICE.

THOMAS BENTON STOVER, OF WINONA, MINNESOTA, ASSIGNOR TO STOVER RUBBER CO., A CORPORATION OF ILLINOIS.

DUO-CORD TIRE CONSTRUCTION.

Application filed October 6, 1922. Serial No. 592,702.

*To all whom it may concern:*

Be it known that I, THOMAS B. STOVER, a citizen of the United States, and a resident of the city of Winona, in the county of Winona and State of Minnesota, have invented certain new and useful Improvements in a Duo-Cord Tire Construction; and I do hereby declare that the following is a full, clear, and exact description of the same, reference being had to the accompanying drawings, and to the numerals of reference marked thereon, which form a part of this specification.

This invention relates particularly to a process or method of manufacturing two-ply clincher cord tires, although the same process may be successfully applied to the manufacture of tires having a greater number of plies of cords.

Heretofore no successful two-ply clincher cord tire has been produced at a cost comparing favorably with that of a casing constructed of four plies of cord fabric to produce a tire that would stand up in use. The four-ply cord has been found to produce a stiffness which causes concentration of the load stresses on a few cords with an increased longitudinal tension thereon and consequently a destructive effort on the casing, and it is one of the objects of my invention to overcome this objectionable feature.

Straight side cord tires have been built heretofore with what amounts to a two ply construction, although the layers are formed by winding a continuous single braided cord over and under the metallic bead fillers required by straight side tire carcasses, instead of first weaving a cord fabric and then placing this fabric onto the core. One such process comprises dipping the single, braided cord into rubber compound; spacing the metallic bead fillers apart a distance corresponding to the circumference of a cross section of the size tire to be built; placing a layer of gum between the fillers and winding the single dipped cord thereover and under with the desired angular arrangement; and then adding an inner layer of rubber and bending the resulting cylindrical section into proper tire form over a core. Such a method of construction is tedious and expensive, and can only be applied to the manufacture of straight sided tires, as an attempt to form the bead cavity required in clincher tires places all the strain on the outer layer of braided cords.

This invention overcomes all of the difficulties and objectionable features above enumerated in that the method I have perfected consists in treating cord fabric with friction compound by a calendering process, then adding heavy top and bottom skims to said cord fabric by the calendering process, then cutting said fabric to lie at the desired transverse angle to form an inner layer, then adding a top layer of frictional cord fabric cut to lie at the desired transverse angle and inserting bead fillers and flipper strips between said layers of prepared cord fabric.

It is an important object of this invention to construct a more resilient and hence an easier riding cord tire.

It is a further important object of this invention to provide increased durability in a cord tire construction by increasing the lateral flexibility of the cords, thus preventing the load stresses from exerting extreme longitudinal tension on the cord fabric embedded in the casing.

It is another very important object of this invention to eliminate flaws in the completed casing by complete insulation of each cord in each layer by a coating of rubber forced into the interstices between the strands to prevent chafing of one cord on another or one layer on the other.

It is still a further object of this invention to enable the use of heavy individual cords woven from 7 to 8 to the inch, and loosely twisted from three to four times to the inch, as compared with the usual practice of using light cords woven approximately 22 to the inch and firmly twisted from six to eight times to the inch, as well as decreasing the angle used in laying the cord fabric and preventing undue local strain on the individual cords by the cushioning effect of the rubber between the plies.

Another object of this invention is to expedite the manufacture of a two-ply cord tire that will not cost more than a multiple ply cord tire, or in fact a fabric tire; in such a way as to produce a better and more resilient tire free from the occasional flaws resulting from too hasty manufacturing methods.

Still a further object of this invention is to increase the longitudinal or circumferential elasticity of the casing by reducing the angle of the cords with respect to the transverse plane of the casing.

Other and further importance objects of this invention will be apparent from the disclosures in the drawings and specification.

The invention (in a preferred form) is illustrated in the drawings and hereinafter more fully described.

On the drawings:

Figure 1 is a transverse section through a tire construction in accord with the present invention.

Figure 2 is a top plan view of a fragmentary section of such a tire spread out before the application of the tread rubber.

Figure 3 is an enlarged fragmentary section corresponding to Figure 1.

As shown on the drawings:

The tire in finished form is covered by a tread portion 1, having side walls 2 extending to the approximate position of the clincher rim, not shown. The different stages of the construction of the actual carcass of the tire are perhaps best shown in Figures 2 and 3 of the drawings.

The cord fabric used is woven with relatively light warp threads comparatively widely spaced as their function is chiefly to separate the heavy cords which are intended to take all the load stresses of the tire. Each cord is built up of a plurality of strands given three or four twists to the inch as such a number of twists has been found to be required to produce a cord that will not separate. These cords are so woven together prior to the manufacture of the tire carcass that each heavy cord is entirely separated from the others and counts 7 or 8 cords to the inch, whereas the prior art uses comparatively light cords, counting approximately 22 to the inch. As mentioned above, the cords or woof of the weave are intended to be completely separated from one another by the light warp threads. The cord fabric is then frictioned with rubber compound which is forced into the interstices of the strands by a calendering process. The lower or inner layer 3 of the cords has a friction and skim or layer of rubber 4 of about 70 gauge applied thereto on the inner surface for the purpose of assuring extreme flexibility of the individual cords to avoid concentrated local stresses, and a skim rubber 5 of about 40 gauge on its upper surface. The layer is then calendered to thoroughly impregnate the cords and to give a uniform distribution of the rubber and retain a uniform spacing of the cord strands to prevent flaws in the fabric. The upper layer of cord fabric 6 is simply frictioned by the rubber calendering process.

For convenience in description, the casing will be considered as built on a plane surface as in Figure 2, although of course it is to be understood that the actual building of a tire carcass will be over a formed core.

The lower layer of cords are so cut that the strands run about 30 to 45 degrees from a transverse plane, and the upper layer 6 is laid with the strands at the same angle on the other side of the same plane so that the strands of the two layers cross each with an angle of about 30 to 45 degrees with the transverse line. Heretofore cord tires have been laid with angles of from 45 to 60 degrees with the transverse line, causing greater strain on the individual strands due to concentrated load stresses and also reducing the longitudinal or circumferential elasticity of the casing.

Starting with the lower layer of cords 3 frictioned and skimmed on both sides as a basis, as described above, formed bead fillers 7 are added on each edge and provided with fabric flipper strips 8 surrounding the bead fillers and extending inwardly from the bead along the top of the lower cord layer. Next the upper layer of cords 6 is added, and carried around the bead fillers to meet the lower cord layer at the toe of the bead. It is important that very little excess rubber other than that serving as friction in the cord layers should be present around the outside of the bead, as the bead must be as firm as possible to prevent a cushioning effect which will chafe and rim cut the tire at this point. The flipper strips serve to prevent the skim rubber from working out onto the bead.

Fabric chafing strips 9, 10, 11 and 12 are added over each bead filler in such a way that they fit down close into the bead cavity and give a solidity to the bead that prevents rubber from working its way around the bead fillers, which would give rise to rim cuts due to the chafing action present in a flexible bead construction. As now constructed, only the top chafing strip 12 is carried over the bead filler right down to the very inside edge thereof and turned up over the edge of the bead and part way up on the inside surface of the casing. If desired, this strip may be trimmed off at the toe, but I prefer to turn it over as illustrated in the drawings. As shown, the carcass is constructed with four chafing strips, but the number may be increased or reduced, although a smaller number would of course reduce the effect desired.

With the chafing strips in place a skim 13 of rubber is applied over the exposed surface of the upper layer of cords and one or more breaker strips 14 are applied thereover. The tire is then finished by the application of the usual tread 1 and side walls 2, composed of a tough rubber compound, and the completed carcass inserted in a mold and cured.

It will thus be apparent that by this method of construction each individual cord is surrounded by a dense coating of rubber and has no contact with other strands either in the same or other layers so that no chafing action can occur. Furthermore rim cuts are eliminated by a plurality of chafing strips at the bead cavity which prevent the hinging action at the edges of the rim from causing a chafing action around the bead which has resulted in the past from the use of too much gum at this point. This construction, together with the acute angle formed by the lay of the superimposed layers of cords, results in a very flexible and resilient casing that is durable as well.

I am aware that numerous details of construction may be varied through a wide range without departing from the principles of this invention, and I therefore do not purpose limiting the patent granted otherwise than necessitated by the prior art.

I claim as my invention:

1. A process of manufacturing tire casings comprising treating cord material with rubber by a calendering process, then skimming both sides for the first ply of cord material, then adding bead filler strips adjacent the outer edges of the first ply of cord material, then adding a second ply of cord material which has been frictioned only, adding chafing strips of fabric along the bead filler strips to prevent rubber from working around the strips to prevent chafing thereabouts, and adding breaker strips and tread stock to complete the carcass of the tire.

2. The method of constructing cord tire carcasses comprising calendering cord fabric with friction compound, then adding top and bottom skims to a layer of said treated cord fabric which has been cut to lie at an angle of less than forty-five degrees to a transverse line to make an inner layer, then adding bead fillers to each edge of the cord fabric, and finally adding a second layer of treated cord fabric without skims and cut to lie at an angle of less than forty-five degrees to the transverse line in a direction opposite to the first layer, the second layer passing outside the bead fillers and meeting the first layer at the toe thereof.

3. The method of constructing cord tire carcasses comprising calendering cord fabric with friction compound, then adding top and bottom skims to a layer of said treated cord fabric cut to lie at an angle of less than forty-five edgrees to a transverse line to make an inner layer, then adding bead fillers surrounded by flipper strips to each edge of the cord fabric, then adding a second layer of treated cord fabric without skims and cut to lie at an angle of less than forty-five degrees to the transverse line in a direction opposite to the first layer, the second layer passing outside the bead fillers and meeting the first layer at the toe thereof, and then adding a plurality of chafing strips arranged in the rim cavity formed by the bead fillers and the cord fabric.

In testimony whereof I have hereunto subscribed my name.

THOMAS BENTON STOVER.